No. 779,827. PATENTED JAN. 10, 1905.
S. S. WILLMOTT.
DEVICE FOR PREVENTING SHOP WINDOW BLINDS RISING BY THE WIND.
APPLICATION FILED JAN. 16, 1904.

Witnesses:
James L. Norris
C. F. Kesler

Inventor
Sidney S. Willmott
By James L. Norris
Atty.

No. 779,827.
Patented January 10, 1905.

UNITED STATES PATENT OFFICE.

SIDNEY S. WILLMOTT, OF MANOR PARK, ENGLAND.

DEVICE FOR PREVENTING SHOP-WINDOW BLINDS RISING BY THE WIND.

SPECIFICATION forming part of Letters Patent No. 779,827, dated January 10, 1905.

Application filed January 16, 1904. Serial No. 189,367.

*To all whom it may concern:*

Be it known that I, SIDNEY SAMUEL WILLMOTT, news agent, a subject of the King of Great Britain, residing at 5 Little Ilford Lane, Manor Park, in the county of Essex, England, have invented a certain new and useful Device for Preventing Shop-Window Blinds Rising by the Wind, of which the following is a specification.

The object of my invention is to provide improved means for preventing shop-window blinds rising by the wind.

According to my invention I provide a pole which is fitted between the blind spreader or rail and the shop-front or facia, so that the said pole acts as a strut to prevent the spreader or rail being raised through the wind exerting force upon or under the blind.

Figure 1:
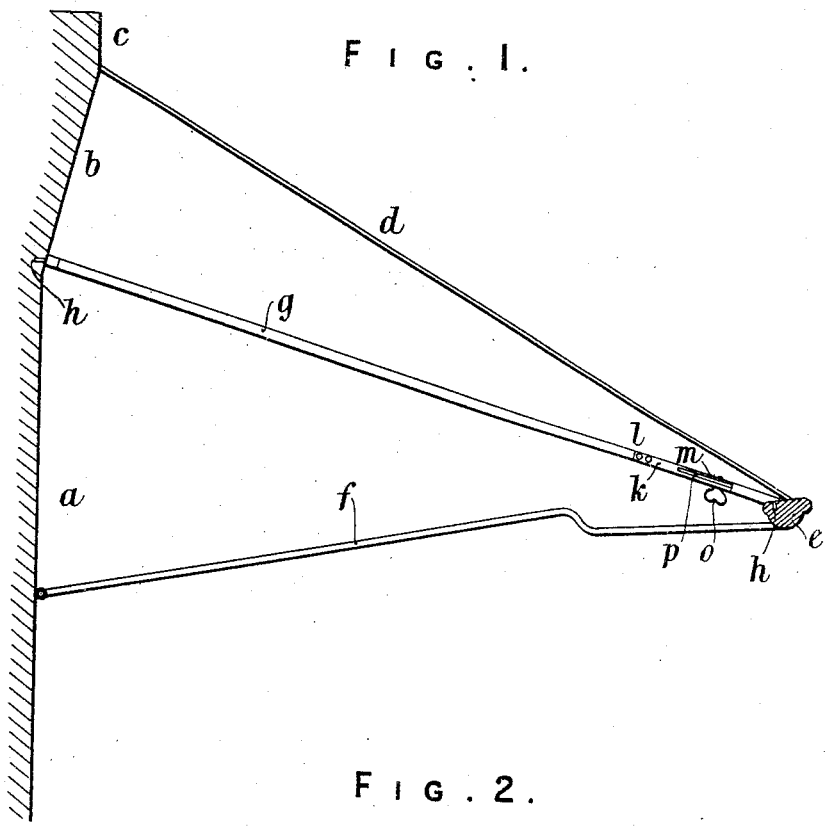
Figure 2:
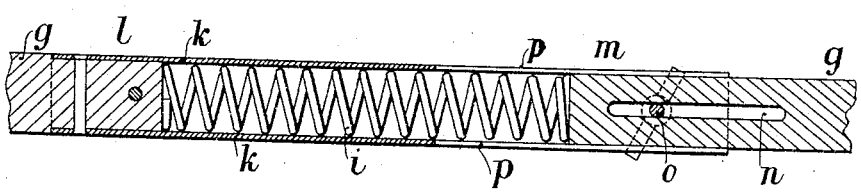
Figure 3:
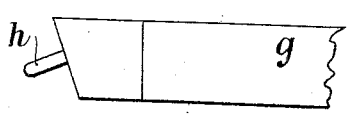
Figure 4:
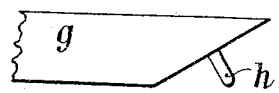

In the accompanying drawings, Figure 1 is a sectional elevation illustrating the application of my pole. Fig. 2 is a longitudinal section of a part of the said pole, and Figs. 3 and 4 are detail views.

$a$ indicates a shop-front; $b$, the facia; $c$, the blind-box; $d$, the blind; $e$, the spreader, and $f$ the side arms.

As shown in Fig. 1, I fit a pole $g$ between the spreader $e$ and the facia $b$ or other suitable part of the front. The ends of said pole $g$ are provided with studs $h$, hooks, or other fittings adapted to engage corresponding sockets or fittings in or on the spreader $e$ and in or on the facia. In order to allow for the shrinkage of the blind through becoming wet, I form the pole so that it is compressible to a limited extent, so that as the blind shrinks the pole automatically becomes shortened to the lesser distance between the spreader and the facia. For this purpose the pole is divided and a spring $i$ is interposed between the ends thereof, a tube $k$, inclosing said spring, being fixed to one of the ends, as at $l$, and free to slide upon the other end, as at $m$. This end of the pole is slotted at $n$, through which slot a bolt or thumb-screw $o$ is fitted. The tube $k$ is split, as indicated at $p$, so that when the nut on the bolt or the thumb-screw $o$ is tightened the tube may be caused to more or less grip the pole, and so prevent or regulate the action of the spring.

I claim—

The combination with a blind-spreader, and a pair of side arms for connecting said spreader with a building, of means for preventing the rising of the spreader and said arms by the wind, said means comprising a pole consisting of an inner and an outer section, said outer section having a slotted inner end, an inclined lug on the inner end of said inner section adapted to engage in the front of the building for connecting said inner section thereto, an inclined lug on the outer end of said outer section adapted to engage in said spreader for connecting said outer section thereto, a tube fixed to the outer end of said inner section and adapted to receive the inner end of said outer section, a spring arranged in the tube and interposed between the outer end of said inner section and the inner end of said outer section, and means extending through said tube and the slotted inner end of said outer section for adjustably connecting said outer section to said tube.

In testimony whereof I have hereunto set my hand in presence of two subscribing witnesses.

SIDNEY S. WILLMOTT.

Witnesses:
GEORGE C. DOWNING,
WALTER J. SKERTEN.